Oct. 25, 1932.    F. R. REUTTER    1,884,238
HUB CAP
Filed July 11, 1930
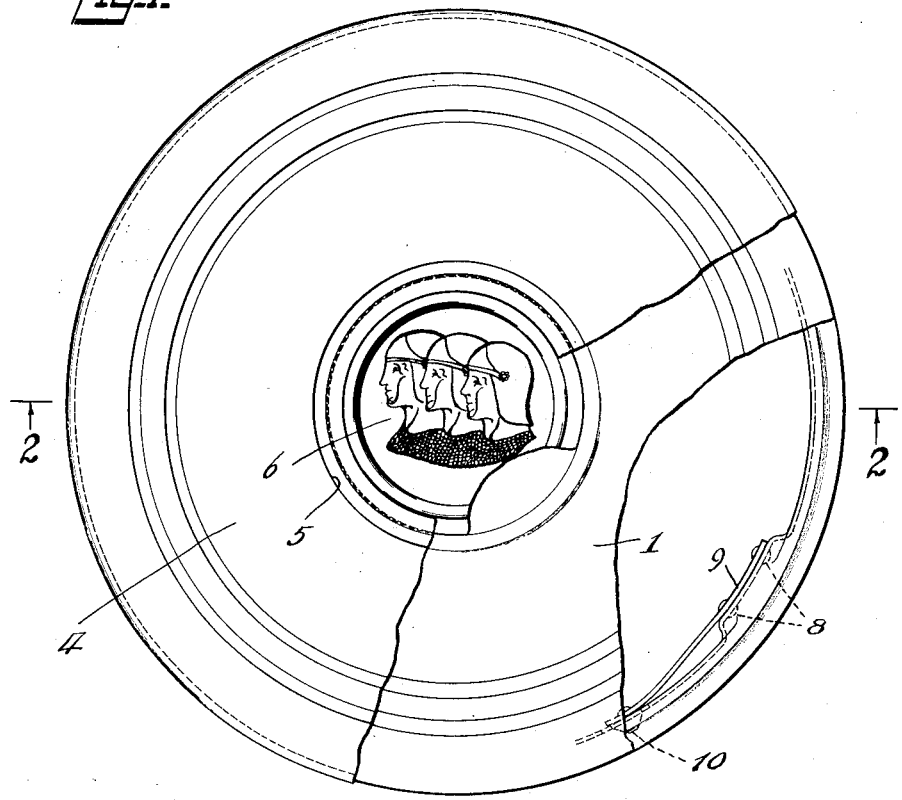
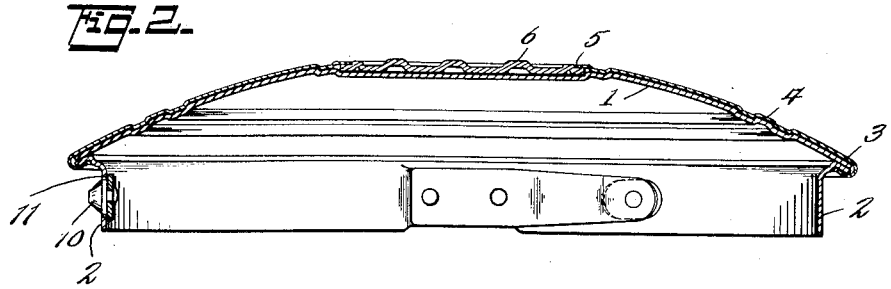
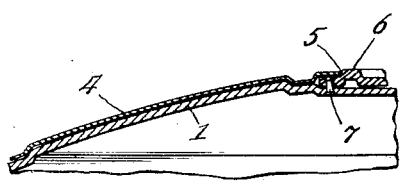
Inventor
Frederick R. Reutter
By his Attorneys Patented Oct. 25, 1932

1,884,238

UNITED STATES PATENT OFFICE

FREDERICK R. REUTTER, OF WATERBURY, CONNECTICUT, ASSIGNOR TO SCOVILL MANUFACTURING COMPANY, OF WATERBURY, CONNECTICUT, A CORPORATION OF CONNECTICUT

HUB CAP

Application filed July 11, 1930. Serial No. 467,249.

This invention relates to improvements in hub caps and especially to automobile hub caps.

The object of the invention is to provide an improved hub cap which is readily and cheaply manufactured, attractive in appearance and readily attached and detached.

In the accompanying drawing forming a part of this specification, there is shown by way of illustration a construction embodying all the features of the invention in its preferred form and this construction will now be described in detail and the features forming the invention then specifically pointed out in the claims.

In the drawing:

Figure 1 is a top plan view of the cap partially broken away to show its construction;

Figure 2 is a sectional view on line 2—2 of Figure 1 and

Figure 3 is a partial sectional view of a modification.

The hub cap comprises a body portion made of sheet metal circular in shape and somewhat disk shaped and has extending substantially at right angles thereto a flange adapted to enter the rim of the automobile hub, this flange preferably being inset from the outer edge of the body portion so that the body portion covers the hub rim when in position on the hub. Extending over the body member and of the same general shape, is an ornamental plate, which is retained in position by bending its outer periphery over the outer periphery of the body member.

Referring to the construction shown in the drawing, the body member is shown as comprising a cap plate 1 and a flanged plate 2 bent outwardly and shaped to lie against the inner side of the outer periphery of the cap plate 1 to form therewith a bead 3 over which the outer periphery of the ornamental plate 4 is bent to firmly and securely hold the parts together. The center of the ornamental plate 4 is provided with a hole 5 in back of which is a design plate 6, the edges of which fit between the ornamental plate 4 and the cap plate 1 so as to be supported by the plates 4, 1 and securely held in position thereby. If desired, the design plate may be secured to the body plate by rivets 7, as shown in Figure 3, to hold the design plate in circumferential position.

The hub cap is secured to the automobile hub by suitable latch devices which preferably are of the form shown. The flange 2 is upset or punched inwardly to form recesses in its outer surface on each of which rivets 8 hold a spring plate 9 on the inner side of flange 2. The opposite end of the spring plate 9 has secured thereto a conical nib 10 which projects through a suitable opening 11 in the flange 2, the nib 10 being adapted to snap into and out of engagement with suitable openings in the automobile hub rim.

It will be understood that the construction may be modified within the invention as defined by the claims.

What is claimed is:

1. In a hub cap, a body member, means on said body member for engaging a hub, an ornamental plate for said body member, said ornamental plate having a hole therein, and a design plate behind said hole and supported by said body member and said ornamental plate.

2. In a hub cap, a body member having an inwardly directed hub engaging flange forming with the body member a circumferential bead, an ornamental plate for said body member having its edges turned over in engagement with said bead, said ornamental plate having a hole therein, and a design plate back of said hole and supported by said body member and said ornamental plate.

3. In a hub cap, a body member turned over and in to form a circumferential bead and a hub engaging flange, means attached to said body member and extending through said flange to lock the cap to the hub, an ornamental plate for said body member having its edges turned over in engagement with said bead, said ornamental plate having a hole therein, and a design plate back of said hole and supported by said body member and said ornamental plate.

In testimony whereof, I have hereunto set my hand.

FREDERICK R. REUTTER.